L. EWALD.
FILTERING APPARATUS.
APPLICATION FILED DEC. 15, 1919.
1,408,279.
Patented Feb. 28, 1922.
3 SHEETS—SHEET 2.
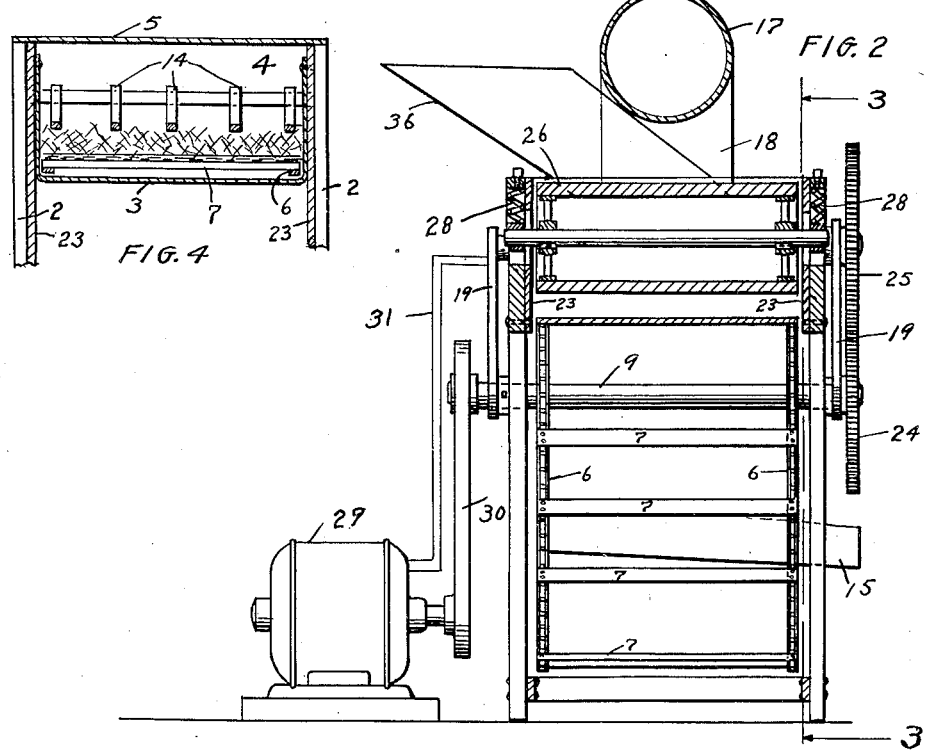
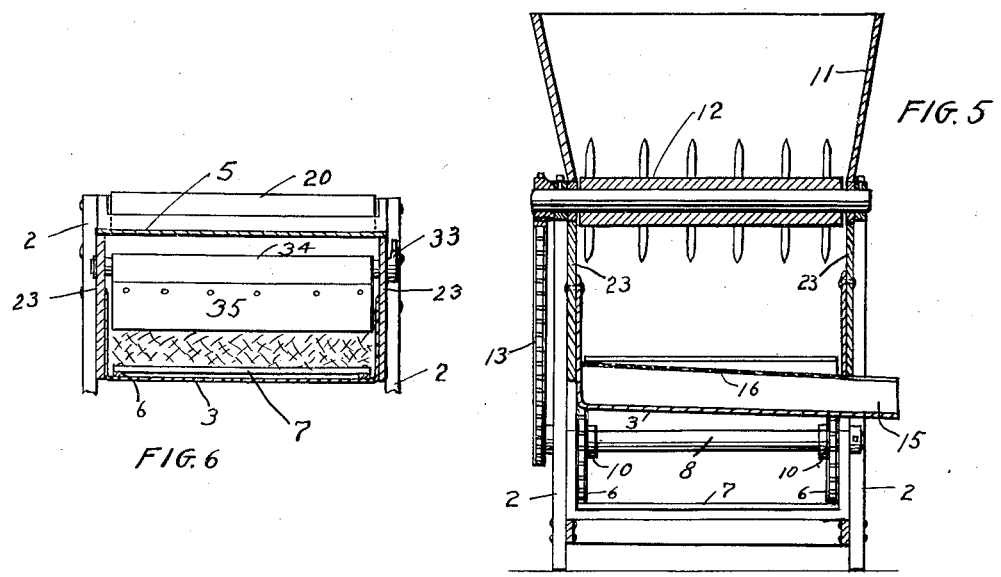
INVENTOR
LEO. EWALD
BY Paul & Paul
HIS ATTORNEYS.

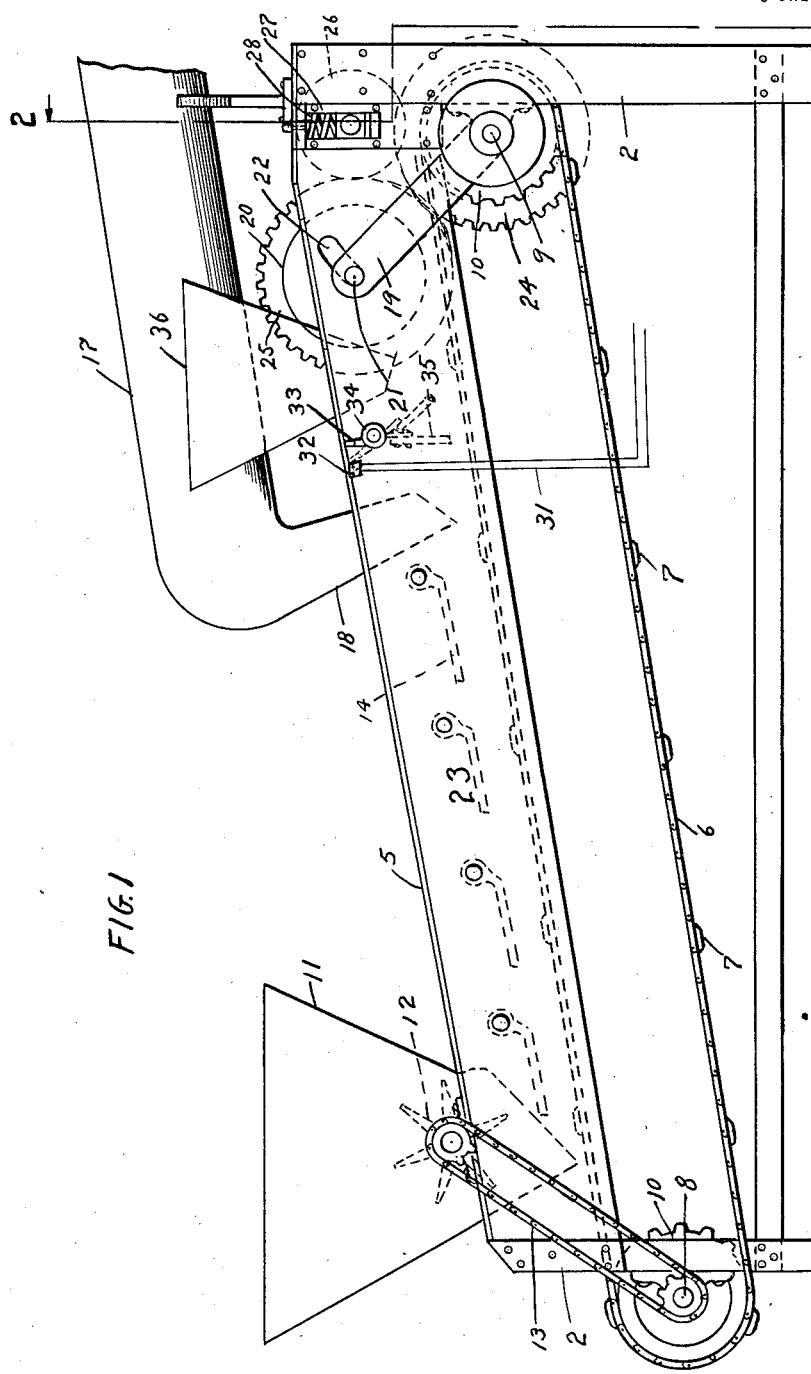

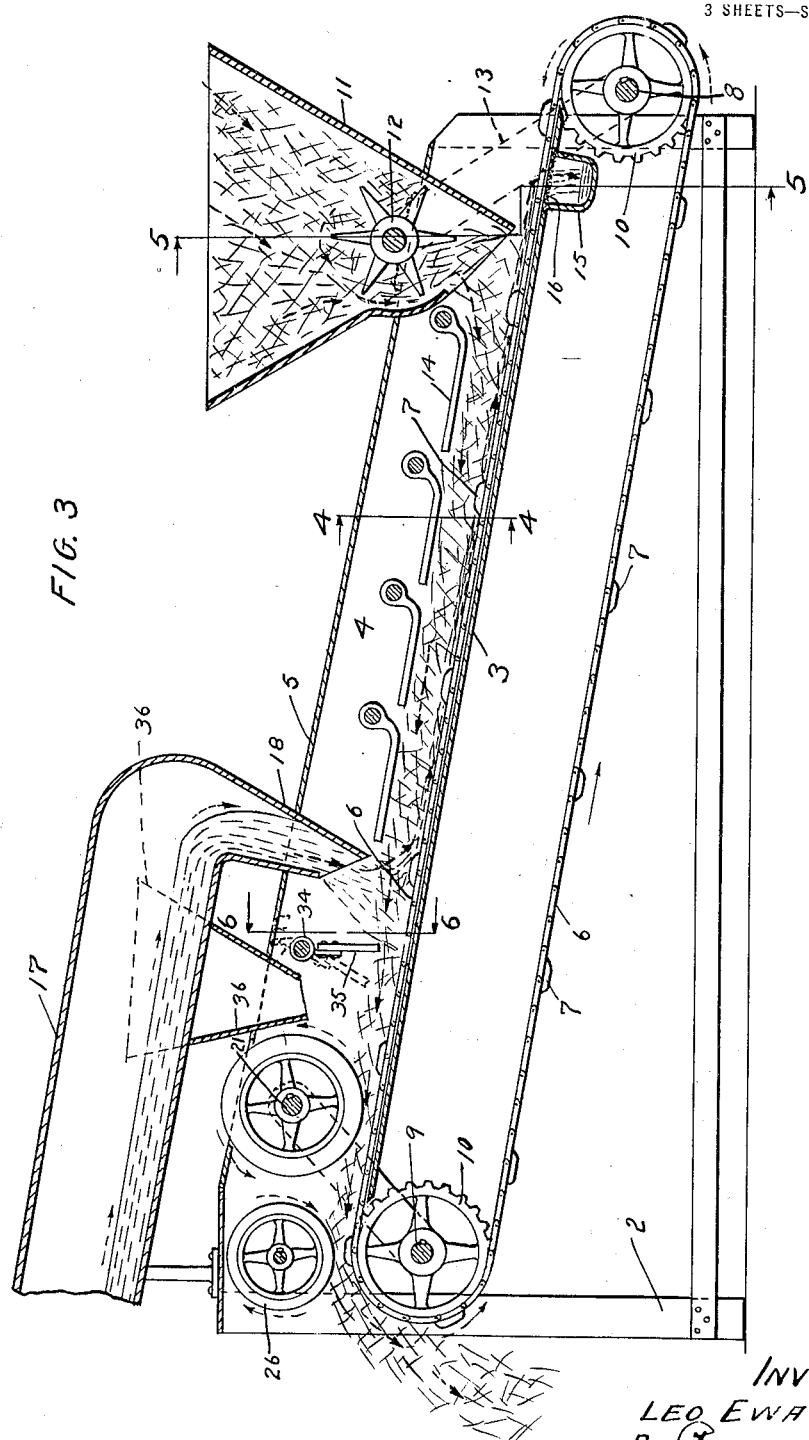

UNITED STATES PATENT OFFICE.

LEO EWALD, OF MINNEAPOLIS, MINNESOTA.

FILTERING APPARATUS.

1,408,279.   Specification of Letters Patent.   Patented Feb. 28, 1922.

Application filed December 15, 1919. Serial No. 344,906.

*To all whom it may concern:*

Be it known that I, LEO EWALD, a citizen of the United States, resident of Minneapolis, county of Hennepin, State of Minnesota, have invented certain new and useful Improvements in Filtering Apparatus, of which the following is a specification.

The object of my invention is to provide a filtering apparatus or machine by means of which the sewage in liquid form discharged from the sewers of a city may be filtered and the fertilizing material in the form of a silt separated from the liquid and discharged at a point where it can be conveniently gathered up and used on the land.

A further object is to provide an apparatus which will be simple and inexpensive in construction and have a large capacity, and be automatic in its operation.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of a filter embodying my invention,

Figure 2 is a sectional view on the line 2—2 of Figure 1,

Figure 3 is a sectional view on the line 3—3 of Figure 2,

Figure 4 is a transverse sectional view on the line 4—4 of Figure 3,

Figure 5 is a sectional view on the line 5—5 of Figure 3,

Figure 6 is a sectional view on the line 6—6 of Figure 3.

In the drawing, 2 represents the frame of the machine. This may be of any suitable size and construction and is located at some convenient point where the liquid sewage from the sewers of the city is discharged. Within said frame I arrange a traveling inclined table 3 above which is a space or chamber 4 beneath a suitable top 5 wherein an apron 6 operates over said table, transverse slats 7 being provided at intervals on said apron to aid in elevating the material in position to receive the liquid sewage. Shafts 8 and 9 are mounted in said frame and provided with sprocket wheels 10 to engage the apron 6. A hopper 11 is provided near the lower end of the frame and is adapted to receive straw or like fibrous material and a toothed feed wheel 12 is mounted in said hopper near its open lower end for discharging the straw from the hopper upon the surface of the traveling apron or belt. This feed wheel 12 is driven by suitable means, such as a chain 13 from the shaft 8.

Above the table and the upper run or strip of the belt I provide a series of pivoted fingers 14 which are adapted to rest upon the straw or other fibrous material on the belt and hold it in a flat sheet thereon. The lower end of the table has a transverse spout 15 for receiving the liquid as it flows down over the table and through a screen 16 that is provided at the point where the floor communicates with the spout. Through this spout the liquid is delivered at any suitable point outside the machine. 17 represents a spout adapted to receive the liquid sewage and having a downwardly turned nozzle 18 through which this sewage is delivered upon the straw or other fibrous material that is brought up by the apron. The straw receiving the sewage at this point operates as a filter, the solid particles of sewage are silt as it is usually called being intercepted and collected by the filtering operation as the liquid flows down through the layer of straw or other fibrous material. Some of the silt will collect on the slats of the apron and be carried up to the upper part of the machine. In this way the sheet of fibrous filtering material will become impregnated with the silt while the liquid will flow down therethrough to the discharge spout at the lower end of the table.

A pair of arms 19 are mounted on the shaft 9 and oscillate thereon and support a pressure roll 20 that is adapted to rest by gravity upon the filtering material and squeeze or compress the moisture therefrom. The shaft 21 of this roll projects through slots 22 in the side walls 23 of the machine and move back and forth therein with the rise and fall of the roll 20.

The roll 20 is driven through gears 24 and 25 on the shafts 9 and 21, the revolution of the roll being in the direction of the arrow in Figure 3 and tending to work the material on the belt downwardly and squeeze it between the periphery of the roll and the belt. Above the shaft 9 is a roll 26, vertically movable in guides 27 and normally held down with a yielding pressure by means of springs 28. After passing under this roll 26 the filtering material with the solid matter of the sewage mixed therein is discharged out of the machine and may then be gathered up and used for fertilizing purposes.

The machine is preferably operated from a motor 29 having a driving connection 30 with the shaft 9 and I prefer to provide an electric circuit 31 for the motor leading to a switch 32 mounted on the machine frame and having a circuit-closing tongue 33 mounted on a hub 34 that is provided with a blade 35 which depends into the path of the material discharged through the nozzle of the sewage pipe 17. When this sewage material has accumulated sufficiently under the nozzle to oscillate the blade 35, the circuit will be closed through the motor and the machine started to feed the filtering material to the pressure rolls at the upper end of the machine. This operation of the machine will continue as long as a sufficient amount of the sewage is delivered to the filtering material to obtain the desired quantity of fertilizer. When the volume of sewage falls below the desired point, the oscillating member 35 will drop by gravity, open the circuit through the motor and stop the machine.

It may sometimes be desirable to deliver an additional supply of the fibrous material after the deposit of the liquid sewage thereon. I therefore provide a spout 36 arranged preferably on the top of the machine beneath the sewage pipe 17 and extending obliquely with respect thereto so that a quantity of the fibrous material, such as straw, may be deposited in the spout at one side of the machine and flow by gravity down upon the surface of the sewage as it is carried along by the sheet of fibrous material beneath. In this way I am able to sandwich the solid matter in the sewage between the upper and lower layers of the fibrous material and in case there should be too large a volume of the liquid sewage on the lower sheet, the upper sheet of fibrous material will cover it and then the entire mass will pass between the squeezing rollers and be discharged at one end of the machine.

I have shown in Figures 1, 2 and 3 how the secondary hopper or spout may be arranged but of course do not confine myself to this particular application to the machine.

In the operation of the machine, the apparatus is placed in position to receive the liquid sewage and when a sufficient quantity of the solids in the sewage have accumulated adjacent to the blade or gate 35, it will be actuated by the pressure and the motor started, as heretofore described, and the fibrous material will then be fed under the spout and the solids in the sewage separated from the liquid, which will flow down to the discharge spout 15 at the lower end of the machine. The solid material is carried with the straw up under the rolls and is then discharged from the machine. As soon as the volume of sewage diminishes below a predetermined quantity, the gate 35 will drop by gravity, the feed of the straw will be stopped, to be resumed again when the volume again increases to the predetermined amount. In this way the operation of the machine is automatic, the feed of the straw or other fibrous material depending upon the volume of solids in the sewage and the operation of the oscillating gate thereby.

I may use straw, hay, leaves or other fibrous material to be saturated or impregnated with the sewage matter and I prefer to cut this material up into short lengths or pieces, so that the mass will be more dense and the absorption of the sewage thereby will be facilitated. The material cut up in this way can also be handled as a fertilizer to better advantage.

In the operation of this machine, there probably will be more or less of an odor around the discharge end of the sewage spout and I may provide at this point a suitable exhaust for drawing away the foul air from the apparatus. This, however, is a conventional or common construction in ventilating devices and I have not thought it necessary to illustrate or describe it herein.

I claim as my invention:

1. A machine of the class described comprising an inclined table having a closed floor, an apron operating thereover, means for delivering a fibrous material to the lower portion of said apron, means near the upper end of said table for delivering the sewage in liquid form to said fibrous material while moving with said apron, and means for subjecting the fibrous material and sewage mixed therewith to pressure to squeeze the moisture therefrom, the liquid flowing lengthwise through said fibrous material to the lower end of said table.

2. A machine of the class described comprising an inclined table, an apron operating thereover, means for delivering a fibrous material to the lower portion of said apron, means for delivering sewage in liquid form to the stream of fibrous material on said apron, the liquid flowing lengthwise through the stream of fibrous material and over said table to the lower end thereof, and pressure rolls mounted to engage the sheet of fibrous material mixed with the sewage and squeeze the liquid therefrom.

3. A machine of the class described comprising an apron operating at an incline, means for delivering a fibrous material to the upper run of said apron, means for delivering sewage in liquid form to said fibrous material, means for subjecting the fibrous material to pressure to remove the moisture from such material and the sewage mixed therewith, and means actuated by the accumulation of sewage on said fibrous material for stopping said feeding means.

4. A machine of the class described comprising means for feeding a fibrous material, means for delivering sewage in liquid form to said fibrous material, means for subjecting the fibrous material to pressure to extract the moisture therefrom, and means actuated by the accumulation of sewage on said fibrous material for automatically controlling the starting and stopping of said feeding means.

5. A machine of the class described comprising means for feeding a sheet of fibrous material, means for holding such material down on said feeding means, a spout having a nozzle arranged to deliver sewage in liquid form upon said fibrous material and pressure rolls mounted to engage the sheet of fibrous material and the sewage mixed therewith and subject the same to a squeezing action.

6. An apparatus for separating solid sewage matter from the liquid comprising means for delivering the sewage, means for feeding a fibrous material into the path of the liquid sewage, and mechanism controlled by the accumulation of the sewage on said fibrous material for controlling the movement of said feeding means.

7. An apparatus for separating solid sewage matter from the liquid comprising means for delivering the liquid sewage, means for feeding a sheet of fibrous material cut up in small pieces into the path of the liquid sewage to collect the solids or silt therefrom as the liquid flows down through the sheet, means for subjecting the sheet of fibrous material mixed with sewage to pressure to squeeze the liquid therefrom and an inclined floor arranged under said feeding means for directing the liquid lengthwise through the sheet of fibrous material.

8. A machine of the class described comprising an inclined table, an apron operating thereover, means for delivering a fibrous material to the lower portion of said apron to be carried up over said table thereby, means for delivering a liquid sewage upon the sheet of fibrous material, means for subjecting the sheet of fibrous material and the sewage mixed therewith to a squeezing action, the liquid flowing down through the fibrous material and depositing the silt therein, and a discharge spout for the liquid provided near the lower end of said table.

9. An apparatus for separating solid sewage matter from the liquid comprising means for delivering the liquid sewage, means for feeding a fibrous material into the path of the liquid sewage to filter the same and separate and collect the silt therein, and means for subjecting the saturated fibrous material to pressure to remove the liquid therefrom, the fibrous material having a support adapted for directing the liquid sewage lengthwise through the sheet of fibrous material.

10. The combination, with a frame, of an inclined floor mounted therein, a feed belt operating over the surface of said floor, a hopper mounted to deliver a fibrous material to the upper run of said belt near the lower end of said floor, means for pressing the sheet of fibrous material down upon said belt, means mounted near the upper end of said floor for delivering sewage in liquid form upon the sheet of fibrous material, and pressure rolls mounted near said sewage delivering means for exerting a pressure on the sheet of fibrous material and squeezing the liquid therefrom.

11. A machine of the class described comprising an apron operating at an incline, means for delivering a fibrous material to the upper run of said apron, means for delivering sewage in liquid form to said fibrous material, means for directing the liquid sewage lengthwise through the sheet of fibrous material, a pressure roll mounted to exert pressure on the sheet of fibrous material and squeeze the liquid therefrom, said roll being mounted to oscillate and adjust itself to the varying thickness of the sheets of fibrous material on said apron.

12. A machine of the class described comprising a floor arranged at an incline, an apron operating thereover, means for delivering fibrous material to the upper run of said apron near the lower end of said floor, means for delivering sewage in liquid form to the sheet of fibrous material on said apron, a roll mounted for oscillation and adapted to rest by gravity upon the sheet of fibrous material to squeeze the liquid therefrom, and a second roll having a vertical movement with respect to said apron.

In witness whereof, I have hereunto set my hand this 8th day of December, 1919.

LEO EWALD.